United States Patent [19]

Uchida et al.

[11] Patent Number: 5,699,466

[45] Date of Patent: Dec. 16, 1997

[54] OPTICAL FIBER CONNECTOR

[75] Inventors: Takahiro Uchida; Keiichiro Akasawa, both of Noda, Japan

[73] Assignee: Miyachi Technos Corporation, Noda, Japan

[21] Appl. No.: 534,788

[22] Filed: Sep. 27, 1995

[30] Foreign Application Priority Data

Sep. 28, 1994 [JP] Japan .................. 6-233175
Aug. 23, 1995 [JP] Japan .................. 7-214979

[51] Int. Cl.⁶ .................................................. G02B 6/36
[52] U.S. Cl. .................................................. 385/80
[58] Field of Search ........................ 385/60–68, 78–84

[56] References Cited

U.S. PATENT DOCUMENTS

| | | | |
|---|---|---|---|
| 5,181,267 | 1/1993 | Gerace et al. | 385/80 |
| 5,222,169 | 6/1993 | Chang et al. | 385/87 |
| 5,233,677 | 8/1993 | Winslow | 385/80 |
| 5,373,573 | 12/1994 | Welsh | 385/75 |
| 5,436,994 | 7/1995 | Ott et al. | 385/86 |
| 5,465,313 | 11/1995 | Belenkiy et al. | 385/80 |
| 5,509,093 | 4/1996 | Miller et al. | 385/84 |

*Primary Examiner*—John Ngo

[57] ABSTRACT

The optical fiber connector is characterized by a cylindrical and ceramic ferrule having a center-axial bore of inner diameter allowing for concentrical insertion of an optical fiber depending upon outer diameter of said optical fiber deprived of its covering layer, and having outer surface coaxial with said center-axial bore, said ferrule being fixed in the connector body of said connector so as to project from said connector body by a predetermined length. Positioning between optical fiber coaxially held in ferrule and corresponding lens unit becomes easier, thereby to have high-power laser beams positively focused on the end surface of the optical fiber and to prevent burning damages of components of the optical fiber connector. Further, once the positioning between lens units and optical fiber has been carried out, any later positioning can be omitted.

6 Claims, 3 Drawing Sheets

OPTICAL FIBER CONNECTOR

FIELD OF THE INVENTION

The present invention relates to optical fiber connector, and in particular to an optical fiber connector which is suitably used for the end portion of optical fiber used for transmission of high-power laser beam.

BACKGROUND OF THE INVENTION

In general, for the purpose of carrying out desired workings such as cutting, soldering, welding and marking, laser beam processing devices are used in many cases.

In these laser processing devices, as shown in FIG. 1, high-power laser beam emitted from laser oscillator 1 is injected through input-side lens unit 2 into optical fiber 3 and then is transmitted to working side of the devices. From the optical fiber 3, laser beam is irradiated through output-side lens unit 4 onto workpiece 5 thereby to carry out a predetermined processing. The beam focusing is such that high-power laser beam from the input-side lens unit 2 is to focus on the corresponding end surface of the optical fiber 3, while laser beam reflected from the workpiece 5 is to focus through output-side lens unit 4 on the other end surface of the optical fiber 3.

For the purpose of connecting the lens units 2,4 to optical fiber 3, optical fiber connectors 6 formed on the respective end portions of optical fiber 3 were used in the heretofore known devices.

In the heretofore known type of optical fiber connector 6 shown in FIG. 2, an optical fiber 3 on which the connector 6 is to be mounted comprises a central core and an outer cladding. Covering layer 7 covers around the outer surface of optical fiber 3 to form an optical fiber cable 8. A portion of the covering layer 7 is removed from the corresponding end portion of optical fiber cable 8 thereby to expose a portion of optical fiber 3. A fiber guide member 9 is coaxially bonded onto the exposed portion of optical fiber 3 and onto the outer surface of the corresponding end portion of the optical fiber cable 8. A metallic protective sleeve 10 is integrally fitted on the outer surface of the fiber guide member 9. The end portion of the guide member 9 corresponding to the end portion of the exposed optical fiber 3 has a length sufficient to completely cover the end portion of optical fiber 3, while a grip claw 12 is formed on the other end portion of the protective sleeve 10 on the side of the cable 8, the grip claw 12 being divided into three equal sectors and having taper screw threads 11 on its outer surface.

A cap nut 13 is then screwed onto the taper screw threads 11 of the grip claw 12 of the protective sleeve 10 to bend this claw 12 inside thereby to clamp the fiber guide 9, thus coaxially securing the protective sleeve 10 onto the fiber guide member 9 as a unit.

The optical fiber connector 6 having a structure as described above is connected to respective lens units by connecting the end portion of its protective sleeve 10 to corresponding lens units through a socket and spigot joint.

However, since the manufacturing accuracy of outer diameter of optical fiber 3 is ±5%, conceptualise between optical fiber 3 and fiber guide member 9 has also an error of ± several percents. Therefore, in the heretofore known devices where protective sleeve 10 is concentrically fitted to fiber guide member 9, a fitting error of ± several percents in concentricity is also found between the protective sleeve 10 and optical fiber 3. As a result, axes of respective lens units 2, 4 and optical fiber 3 connected together in the socket and spigot joint manner using the outer surface portion 10a of the end portion of the protective sleeve 10 as reference surface do not coincide with each other, so that high-power laser beam maybe be injected on other surface than the end surface of optical fiber 3, thereby causing any burning damages on the end portion of optical fiber 3 and/or adhesives.

Further, when carrying out any working on workpiece 5 by irradiating laser beam through output-side lens unit 4 from output-side end of optical fiber 3 onto these works 5 in the heretofore known connector 6, a portion of laser beam reflected from the workpiece 5 may be back-injected into optical fiber 3 through the lens unit 4.

In this case, angles of incidence of these reflected laser beams are varied depending upon the relative position to the workpiece 5, as shown in FIG. 3. More specifically, a laser beam A injected normally into the end surface of optical fiber 3 will be transmitted backwards in the optical fiber 3 without any problem. However, an incident laser beam B through the cladding of optical fiber 3 or another incident laser beam C having an angle of incidence exceeding maximum theoretical value of numerical aperture (NA) can not be transmitted backwards in optical fiber 3, but may be radiated through the cladding of fiber 3 into the peripheral portion of optical fiber 3. Laser beams radiated from the peripheral portion of fiber 3 have the risk of burning the inner surface of the fiber guide member 9, thus bringing about burning damages of optical fiber 3 itself.

SUMMARY OF THE INVENTION

For the purpose of eliminating the problems described above, the present invention has as its first object to deliver an optical fiber connector in which an optical fiber and a member for connecting the optical fiber inserted therein to corresponding lens unit can be positioned to each other in exactly coaxial state, in which high-power laser beam can be positively focused on the end surface of optical fiber, in which heating and burning of components of the optical fiber connector can be positively prevented with a simple construction and assembly, and in which repeated positioning after the first positioning is perfectly unnecessary at the exchange of optical fiber.

The present invention has as its second object to deliver an optical fiber connector which, along with the first object, can achieve a coaxial positioning between the optical fiber and the member for connecting the optical fiber to lens unit, reasonably correcting to dispersion of outer diameter of the optical fiber in its naked state i.e. having no covering layer.

The present invention has as its third object to deliver an optical fiber connector which, along with the first and second objects, can positively prevent radiation of laser beams through the peripheral surface of the optical fiber, thereby to eliminate burning and damages of components constituting the connector.

For the purpose for achieving the first object, the optical fiber connector according to the invention is characterized by a cylindrical and ceramic ferrule having an axial bore of inner diameter allowing for concentrical insertion of an optical fiber depending upon outer diameter of the optical fiber stripped of its covering layer, and having outer surface coaxial with the axial bore, the ferrule being fixed in the connector body of the connector so as to project from the connector body by a predetermined length.

According to the present invention, optical fiber and outer surfaces of ferrule can be automatically positioned coaxially by inserting the optical fiber into an optical fiber connector holding a ferrule having axial bore corresponding to outer diameter of the optical fiber stripped of its covering layer.

Since optical fiber connector of the present invention has the construction described above, optical fiber and the ferrule connected on the side of lens unit can be easily positioned to each other in an exact coaxial position. A connection tube on the side of lens units can be connected to the ferrule extending from the connector body by a predetermined length in a socket and spigot joint manner, so that the ferrule and corresponding lens unit are always maintained in the same positional relationship to each other. Therefore, positioning between optical fiber coaxially held in ferrule and corresponding lens unit becomes easier, thereby to have high-power laser beams positively focused on the end surface of the optical fiber and to prevent burning damages of components of the optical fiber connector. Further, once the positioning between lens units and optical fiber has been carried out, any later positioning operation can be omitted even at the later exchange of optical fiber, since at the exchange of optical fiber, a new optical fiber can be coaxially positioned in the ferrule at quite the same position as that of the old optical fiber, while at the same time the new optical fiber can be automatically positioned with corresponding lens units. Furthermore, the optical fiber connector has a simple construction and can be easily assembled.

For achieving the second object of the present invention, optical fiber connector is characterized by a protective sleeve as its component for holding substantially the portion of an optical fiber covered by covering layer, and by a cylindrical and ceramic ferrule having an axial bore of inner diameter allowing for concentrical insertion of an optical fiber depending upon outer diameter of the optical fiber stripped of its covering layer and having an outer surface coaxial with the axial bore, the ferrule being fixed at one end of the protective sleeve so as to project from the connector body by a predetermined length.

According to the invention, the ferrule can be easily inserted and assembled into the protective sleeve constituting the connector body of the optical fiber connector. Thus, a plurality of ferrule having the axial bore of different inner diameters corresponding to the dispersion of manufacturing accuracy of outer diameter of optical fiber are prepared before hand, and a ferrule having an axial bore of an inner diameter reasonably corresponding to outer diameter of an optical fiber to be inserted is selected from the above prepared ferrules or from the group of protective sleeve/ferrule assemblies, the selected ferrule being then inserted into the protective sleeve thereby to form an optical fiber connector. Thus, a coaxial positioning of the optical fiber and ferrule can be easily and positively carried out.

By fixing the ferrule on the top of the protective sleeve as a component of connector body of optical fiber connector, the first object of the invention described above can be achieved, while at the same time coaxial positioning between the optical fiber and the ferrule, correcting the dispersion of manufacturing accuracy of outer diameter of optical fiber, as well as lens unit can be exactly carried out.

For the purpose of achieving the third object of the present invention, the optical fiber connector having the construction for achieving the first object or the second object of the invention is further characterized in that the optical fiber being bonded at least to the ferrule by means of an adhesive having a lower refractive index than that of the optical fiber.

Accordingly, even when laser beams irradiated from the side of lens unit such as laser beams reflected from the workpiece are inputted into the optical fiber connector at abnormal angles of incidence and are radiated outwards through the cladding of the optical fiber, these laser beams are reflected by the low refractive index adhesive to be inputted back into the optical fiber, thereby to prevent laser beams from radiating through the peripheral surface of optical fiber, with the result of eliminating the risk of burning of inner surfaces of protective sleeve and the ferrule as well as the optical fiber itself.

DETAILED DESCRIPTION OF THE EMBODIMENTS

Figure 1:
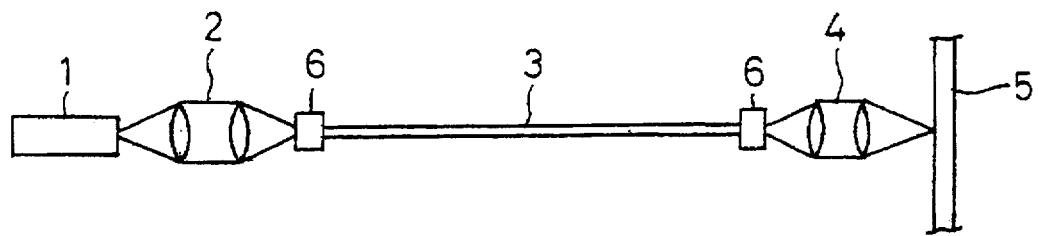
FIG. 1 is a schematic view of an example of the heretofore known optical fiber connectors.
Figure 2:
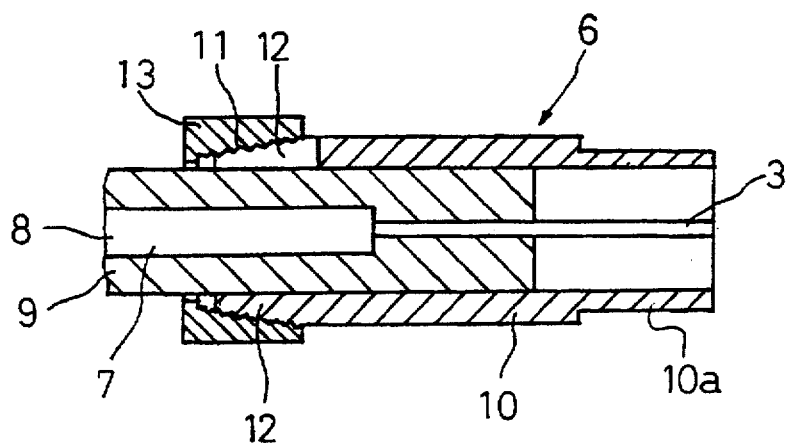
FIG. 2 is an enlarged cross-sectional view of a heretofore known optical fiber connector.
Figure 3:
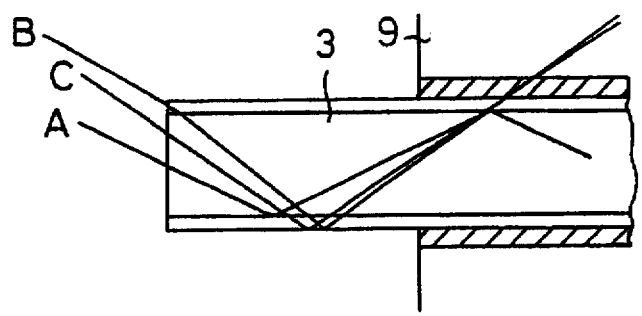
FIG. 3 is a schematic view showing the reflection state of laser beams in the heretofore known optical fiber connector.
Figure 4:
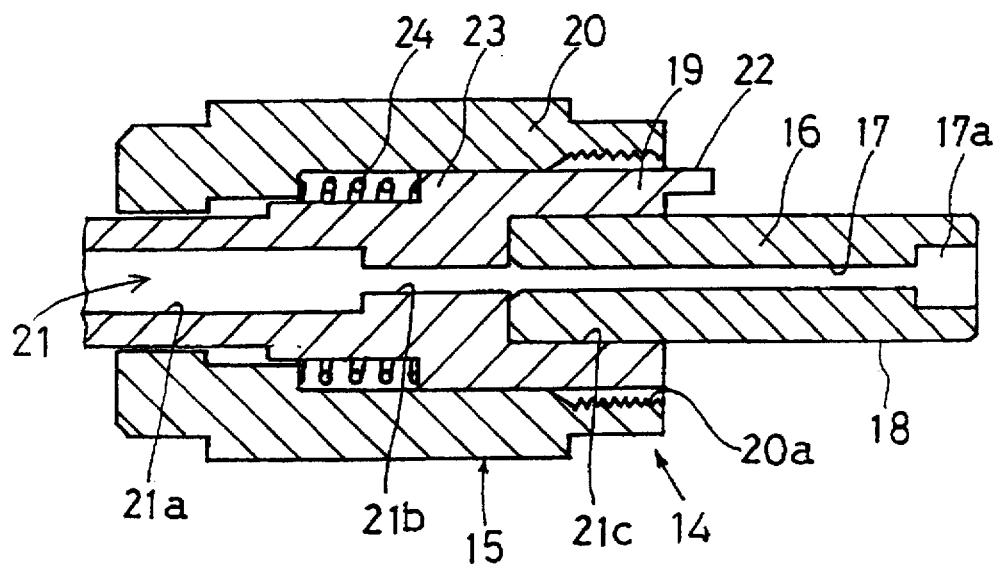
FIG. 4 is a cross-sectional view of an embodiment of optical fiber connector according to the invention.
Figure 5:
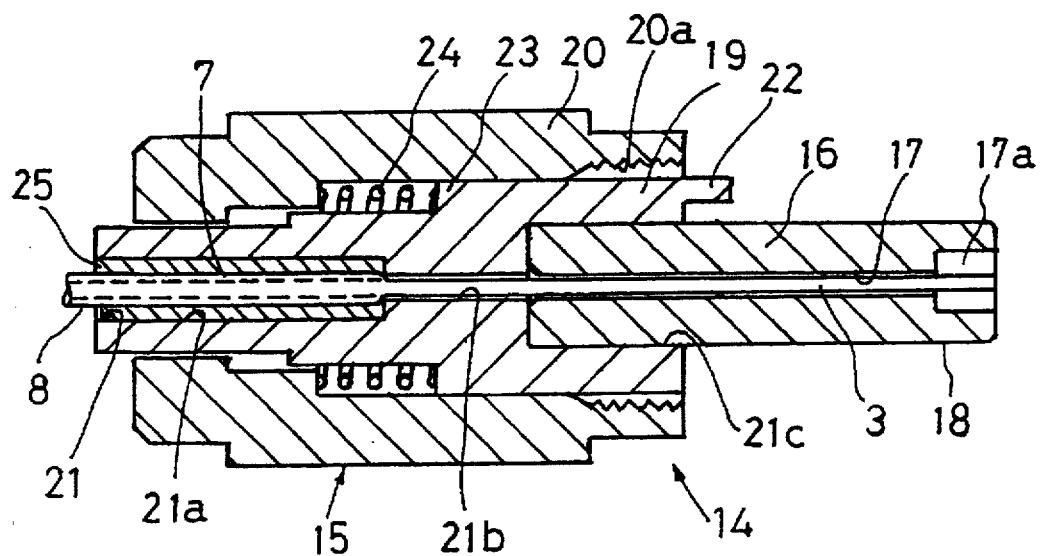
FIG. 5 is a cross-sectional view of the embodiment of optical fiber connector according to the invention, shown in FIG. 4, provided therein with an optical fiber therein.
Figure 6:
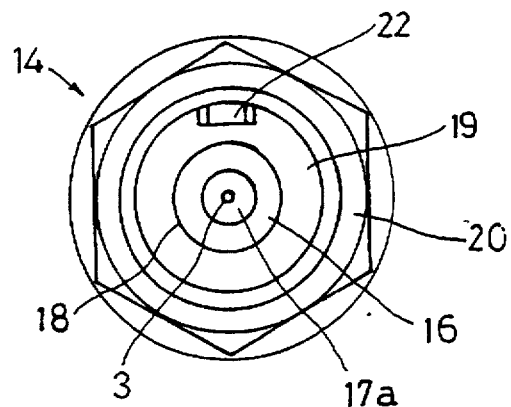
FIG. 6 is a side view from the right of the embodiment shown in FIG. 5

With reference to FIG. 4 to FIG. 8 showing the embodiments of optical fiber connector according to the invention, in which FIG. 4 to FIG. 6 show an embodiment according to the invention. FIG. 4 shows only an optical fiber connector 14 formed so as to achieve the first and second objects of the present invention, while FIG. 5 and FIG. 6 show an optical fiber connector 14 according to the invention connected to the end portion of an axial optical fiber 3.

Optical fiber connector 14 according to the invention comprises essentially a connector body 15 containing therein a portion of optical fiber cable 8 consisting of covering layer 7 and optical fiber 3 and a ferrule 16 containing the naked portion of the cable 8 deprived of covering layer 7.

The ferrule 16 comprises a relatively long tube of ceramic material having center-axial bore 17 and outer surface 18 coaxial to the bore 17. The ferrule 16 according to the invention is formed from opaque ceramics such as for example zirconia, alumina or mica ceramics, so that due to its ceramic material, the ferrule 16 can be manufactured with a high accuracy. For example, concentricity of the center-axial bore 17 and the outer surface 18 can have an accuracy of several micrometers, while inner diameter of the center-axial bore 17 and outer diameter of the outer surface 18 can also be manufactured respectively with an accuracy of several micrometers. According to the invention, the outer surface 18 of ferrule 16 and axis of optical fiber 3 can be automatically positioned in a concentric position only by inserting the optical fiber 3 into the center-axial bore 17 having a high accuracy in the ferrule 16. On the other hand, the manufacturing accuracy of outer diameter of the optical fiber 3 itself consisting of axial core and outer cladding reaches as high as ±5%, so that an optical fiber 3 having an outer diameter of nominal 500 micrometers may have in practice a wide range of outer diameter from 475 to 525 micrometers, which renders impossible a concentric positioning in the order of micrometer. Therefore, according to the invention, a plurality of ferrules 16 are prepared each having a center-axial bore 17 of inner diameter equal to the corresponding nominal outer diameter centered in respective equal sections of range of error in outer diameter of the optical fiber 3. Further, a portion 17a of larger inner diameter is made at the top portion of center-axial bore 17 in ferrule 16.

The connector body 15 can be made in any way so long as to carry the ferrule 16 projected therefrom by a predetermined extension length. For example, the connector by 15 can comprise center-axial bore 21, which bore 21 comprising a rear portion 21a and intermediate portion 21b for receiving therein the optical fiber 3 and a top portion 21c for receiving the ferrule 16, and the ferrule 16 received into the top portion 21c. In this case, the top portion 21c of the center-=axial bore 21 should have a length allowing for projection of the ferrule 16 from the connector body 15 by a predetermined length.

As shown in FIG. 4, use of protective sleeve 19 renders easier the inserting operation of the optical fiber and many protect suit optical fiber.

According to the invention, the connector body 15 is formed by the metallic protective sleeve 19 for receiving the ferrule 16 at its top portion, and a securing tube 20 which is mounted rotatably and shiftably in axial direction on the outer surface of the protective sleeve 19 and which as a female screw portion 20a for engaging with a securing tube (not shown) of the lens unit. More specifically, the protective sleeve 19 is formed approximately in a pipe form, wherein the center-axial bore 21 comprising the rear portion 21a having inner diameter capable of receiving therein the optical fiber cable 8 with its covering layer 7, the intermediate portion 21b having inner diameter capable of receiving therein the optical fiber 3 with the covering layer 7 removed and the top portion 21c having inner diameter capable of receiving therein with press filling the ceramic ferrule 16. An engaging projection 22 for non-rotatable connection to the lens unit is formed on the front end surface of the protective sleeve 19, the engaging projection 22 engages with corresponding engaging groove (not shown) formed on the lens units 2, 4. Further, a compression spring 24 is provided between outer step 23 of the protective sleeve 19 and the securing tube 20. When the connector body 15 is mounted on the lens units 2, 4, the compression spring 24 serves for compressing the projection 22 of the protective sleeve 19 into the groove of the lens units 2, 4 thereby to prevent any relative rotation between them.

The operation of this embodiment is described below with reference to FIG. 5 and FIG. 6.

Outer diameter of the end portion of optical fiber 3 stripped of its covering layer 7 is first measured. Then, an optical fiber connector 14 whose connector body 15 has a center-axial bore 17 of its ferrule 16 corresponding to the predetermined practical outer diameter of the optical fiber 3 is selected and prepared.

Adhesive 25 is applied only on the outer surface of covering layer 7 of the optical fiber cable 8, and an optical fiber 3 is then inserted into the center-axial bore 21 of the protective sleeve 19 thus prepared from the side of the rear end portion 21a thereof. At the same time, the optical fiber 3 stripped of its covering layer 7 passes through the center-axial bore 21 of the protective sleeve 19 and then through the center-axial bore 17 of the ferrule 16. When the optical fiber 3 is inserted until the front end of the covering layer 7 of cable 8 bears against the corresponding front end of the rear section 21a of the center-axial bore 21 of protective sleeve 19, the covering layer 7 of the cable 8 and the corresponding portion of inner surface of the protective sleeve 19 are then bonded together with the adhesive 25.

According to the embodiment described above, when the optical fiber 3 stripped of its covering layer 7 is inserted into the center-axial bore 17 of the ferrule 16, an automatic and positive coaxial positioning of the outer surface of optical fiber 3 and the outer surface 18 of ferrule 16 is obtained, since the center-axial bore 17 has an inner diameter adapted to coaxially receive the optical fiber 3. Such a coaxial positioning process is much simpler than that of heretofore known processes, and the construction of the optical fiber connector 14 according to the invention is much simpler and can be assembled much more easily with lower cost.

After the assembling of optical fiber 3 and optical fiber connector 14, a connection tube (not shown) on the side of lens units is connected to the outer surface 18 of ferrule 16 extending from the connector body 15 in a socket and spigot joint manner, while at the same time the engaging projection 22 of the protective sleeve 19 engages into the corresponding groove (not shown) on the lens units, thereby to exactly position the optical fiber 3 and the lens units to each other in three dimensional space. Thereafter, the securing tube 20 secures the optical fiber 3 and the lens units together, thereby preventing any positional deviation. Accordingly, positioning between optical fiber 3 held coaxially in ferrule 16 and lens units can be carried out easily, and high-power laser beams can be positively focused onto the end surface of optical fiber 3 thereby to prevent components of connector 14 from any burning and damages thereof. Due to the coaxial positioning between the outer surface of optical fiber 3 and the outer surface 18 of ferrule 16 obtained as described above, once the positioning between lens units and optical fiber 3 has been carried out, any later positioning operation can be omitted even at the later exchange of optical fiber 3. More specifically, at the exchange of optical fiber 3, a new optical fiber 3 can be coaxially positioned in the ferrule 16 at quite the same position as that of the old optical fiber 3, while at the same time the new optical fiber 3 can be automatically positioned to corresponding lens units. Thus, on both input side and output side of the optical fiber 3, high-power laser beams can be always exactly focused on the end surface of optical fiber 3, thereby to prevent positively any burning damages thereof.

Even when high-power laser beams are inputted into the gap between optical fiber 3 and the inner surface of center-axial bore 17 of ferrule 16, the laser beams are diffused on their passing through a relatively long center-axial bore 17, thereby to prevent burning damages on the covering layer 7 of optical fiber cable 8.

Now, the operational effects of the protective sleeve 19 set into the connector body 15 of connector 14 are described below.

The optical fiber connector 14 shown in FIG. 4 can be simply assembled by fixing a ferrule 16 into protective sleeve 19 in the connector body 15. Thus, a plurality of ferrule 16 having different inner diameters corresponding to the dispersion of manufacturing accuracy of outer diameter of optical fiber 3 are prepared beforehand, and a ferrule 16 having an center-axial bore 17 of an inner diameter reasonably corresponding to outer diameter of an optical fiber 3 to be inserted is selected from the above prepared ferrules 16 or from the group of protective sleeve/ferrule assemblies, the selected ferrule 16 being then inserted into the protective sleeve 19 thereby to form an optical fiber connector 14. Thus, a coaxial positioning of the optical fiber 3 and ferrule 16 can be easily and positively carried out. Further, since the protective sleeve 19 and the ferrule 16 are separately formed, an optical fiber connector 14 corresponding reasonably to various outer diameter of optical fiber 3 can be obtained by using a group of protective sleeves 19 having each the top portion 21c of axial bore 21 of the same inner diameter and other groups of ferrule 16 having the same outer diameter of outer surface 18 and different inner diameters of center-axial bore 17. Optical fiber connector 14 according to the invention can thus be manufactured much more simply and at lower cost in comparison with a connector where protective sleeve 19 and ferrule 16 are integrally manufactured.

By using a protective sleeve 19 as component of connector body 15 of optical fiber connector 14 and fixing a ferrule 16 on the top end of the protective sleeve 19, the above described first object can be achieved, while at the same time a coaxial positioning between optical fiber 3 and ferrule 16 as well as lens units can be obtained reasonably correcting dispersion of manufacturing accuracy in outer diameter of optical fiber 3.

Figure 7:
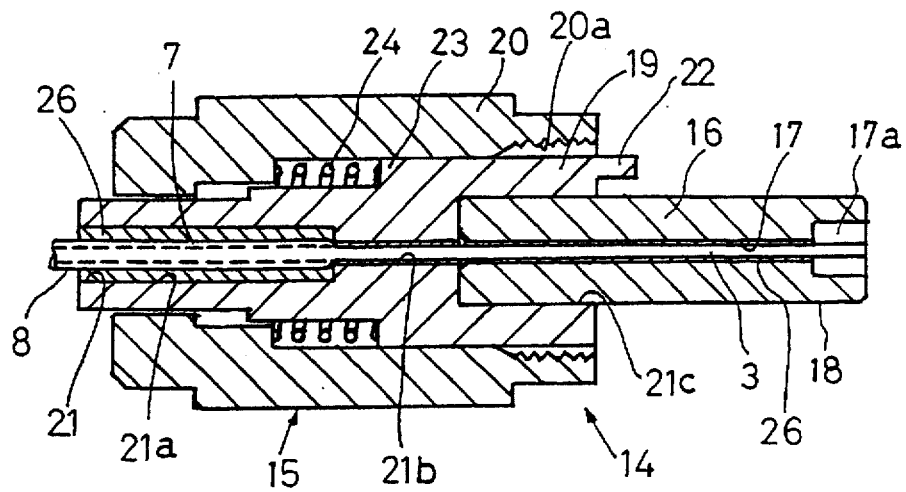
FIG. 7 is a cross-sectional view of the embodiment of optical fiber connector according to the invention shown in FIG. 4, and provided with an optical fiber by means of an adhesive of low refractive index.
Figure 8:
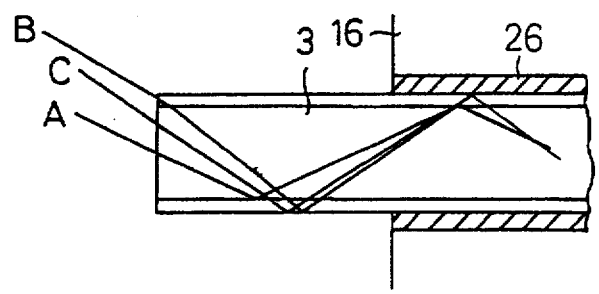
FIG. 8 is a cross-sectional view showing the reflection state of laser beams in the optical fiber connector according to the invention shown in FIG. 7.

Referring to FIG. 7 and FIG. 8, for achieving the third object of the present invention described above, the embodiment shown in FIG. 7 uses the optical fiber connector 14 shown in FIG. 5 with the operational effects and further is formed so as to prevent the radiation of laser beams through the peripheral surface of optical fiber, thereby preventing burning damages of components of optical fiber connector.

The embodiment shown in FIG. 7 has an additional component, to the embodiment shown in FIG. 5, of low refractive index adhesive 26 between inner surface of center-axial bore 17 of ferrule 16 and outer surface of optical fiber 3 for bonding them together.

The low refractive index adhesive 26 can be made from a material such as adhesive having a lower refractive index than that of optical fiber 3, for example having a refractive index of 1.4 or less than 1.4. Using of a lower refractive index than that of optical fiber 3 has the effect of reflecting any laser beams outputted through the peripheral surface of optical fiber 3 back into the inside thereof owing to the difference of refractive indexes between optical fiber 3 and the adhesive 26.

The portion of optical fiber cable 8 covered by covering layer 7 may be bonded to the protective sleeve 19 by means of a low refractive index adhesive 26 or otherwise by means of an epoxy resin adhesive 25 for higher bonding strength.

Concerning to the assembling process of this embodiment, outer diameter of the end portion of naked optical fiber 3 stripped of covering layer 7 is first measured. Then, an optical fiber connector 14 whose connector body 15 has a center-axial bore 17 of its ferrule 16, fixed to its protective sleeve 19, corresponding to the total of the predetermined practical outer diameter of the optical fiber 3 and thickness of the low refractive index adhesive 26 is selected and prepared.

A low refractive index adhesive 26 is applied on the outer surfaces of the optical fiber 3 and the outer surface of the optical fiber cable 8, and the optical fiber 3 is then inserted into the center-axial bore 21 of the protective sleeve 19 thus prepared from the side of its rear end portion 21a. At the same time, the optical fiber 3 stripped of covering layer 7 passes through the center-axial bore 21 of the protective sleeve 19 and then through the center-axial bore 17 of the ferrule 16. When the optical fiber 3 is inserted until the front end of the covering layer 7 of cable 8 bears against the corresponding front end of the rear section 21a of the center-axial bore 21 of protective sleeve 19, the optical fiber 3 and the ferrule 16 on the one hand and the protective layer 7 of the cable 8 and the corresponding portion of inner surface of the protective sleeve 19 on the other hand are respectively bonded together with the low refractive index adhesive 26.

In the embodiment thus formed, operational effect due to the low refractive index adhesive 26, bonding the optical fiber 3 and the ferrule 16 is obtained as well as the same operational effects as in the above embodiments.

With respect to the operational effect due to the low refractive index adhesive 26, in the embodiment where optical fiber 3 is bonded to ferrule 16 by means of adhesive 26 having a lower refractive index than that of optical fiber 3 such as silicone resin adhesive, even when laser beams irradiated from the side of lens unit such as laser beams reflected from the workpiece are inputted into the optical fiber connector 14 at abnormal angles and are outputted outwards through the cladding of the optical fiber 3, these laser beams are reflected by the low refractive index adhesive 26 to be inputted back into the optical fiber 3, thereby to prevent laser beams from outputting through the peripheral surface of optical fiber 3, with the result of eliminating the risk of burning of inner surfaces of protective sleeve 19 and the ferrule 16 as well as the optical fiber 3 itself.

More specifically, the low refractive index adhesive 26 has an index of 1.4 or lower than 1.4 while on the other hand the refractive index of cladding is 1.439 for SI (Step Index) type and 1.452 for GI (Graded Index) type, therefore, since the peripheral surface of optical fiber 3 is covered by means of adhesive 26 having a refractive index lower than 1.4, any laser beams such as B and C as shown in FIG. 8 which have been inputted at abnormal angles into the optical fiber 3 and then have been outputted outwards therefrom can be reflected in the adhesive 26 back into the optical fiber 3.

In such a construction of the embodiment according to the invention, since the outer surface of the optical fiber 3 is bonded by means of the low refractive index adhesive 26 having a refractive index of 1.4 or lower, even when laser beams reflected from the workpiece are inputted into the optical fiber 3 and are outputted outwards through the cladding of the optical fiber 3, these laser beams are refracted by the low refractive index adhesive 26 to be inputted again into the optical fiber 3, thereby to prevent laser beams, inputted to the cladding of the optical fiber 3, from radiating into the peripheral surface of optical fiber 3, with the result of eliminating the risk of burning of inner surfaces of protective sleeve 19 and the ferrule 16 as well as the optical fiber 3 itself.

Projection of the ferrule 16 from connector body 15 of the optical fiber connector 14 according to the invention shows the following operational effects that the optical fiber 3 and the ferrule 16 containing therein the optical fiber 3 and connected to lens unit can be exactly coaxially positioned, that high-power laser beam can be positively focused on the end surface of optical fiber, that heating and burning of components of the optical fiber connector 14 can be positively prevented with a simple construction and assembling, and that repeated positioning after the first positioning is perfectly unnecessary at the exchange of optical fiber.

Further, the connector 14 according to the invention has a protective sleeve 19 as a component of connector body 15, and the ferrule 16 is fixed to the protective sleeve 15, so that the following effects can be obtained, i.e. coaxing positioning between the optical fiber 3 and the ferrule 16 connected to lens unit as well as lens unit itself can be carried out with a high accuracy correcting dispersion of manufacturing accuracy of outer diameter of the optical fiber 3 stripped of its covering layer 7.

In the case where both ends of an optical fiber 3 are respectively connected to input and output lens units, a pair of optical fiber connectors 14 having the same type can be connected on both side ends, thereby to prevent such problem as error of direction in connection, wherein laser beams emitted from not-shown laser oscillator are transmitted through the optical fiber 3 to the output lens unit which irradiates the laser beams onto workpiece.

While the present invention has been described with reference to exemplary embodiments thereof, it will be appreciated by those skilled in the art that variations and modifications may be made thereto without departing from the spirit of the inventive concepts disclosed herein. All such variations and modifications are intended to fall within the scope of the claims appended thereto.

What is claimed is:

1. Optical fiber connector characterized by a cylindrical and ceramic ferrule having a center-axial bore of inner diameter allowing for concentrical insertion of an optical fiber depending upon outer diameter of said optical fiber deprived of its covering layer and having an outer surface coaxial with said center-axial bore, said ferrule being projected from said connector body by a predetermined length, and said optical fiber being bonded at least to said ferrule by means of a low refractive index adhesive having a lower refractive index than that of said optical fiber.

2. Optical fiber connector according to claim 1 characterized in that said low refractive index adhesive is silicone resin type adhesive.

3. Optical fiber connector which is characterized by a protective sleeve as a component of the connector body for holding the portion of an optical fiber substantially covered by covering layer, and by a cylindrical and ceramic ferrule having a center-axial bore of inner diameter allowing for concentrical insertion of an optical fiber depending upon outer diameter of said optical fiber deprived of its covering layer and having an outer surface coaxial with said center-axial bore, said ferrule being fixed at one end of said protective sleeve so as to project from said connector body by a predetermined length, and said optical fiber being bonded at least to said ferrule by means of a low refractive index adhesive having a lower refractive index than that of said optical fiber.

4. Optical fiber connector according to claim 3 characterized in that said low refractive index adhesive is silicone resin type adhesive.

5. Optical fiber connector characterized by a cylindrical and ceramic ferrule having a center-axial bore of inner diameter allowing for concentrical insertion of an optical fiber depending upon outer diameter of said optical fiber stripped of its covering layer and having an outer surface coaxial with said center-axial bore, said ferrule being projected from said connector bore by a predetermined length, and said optical fiber being bonded at least to said ferrule by means of an adhesive having a lower refractive index than that of said optical fiber.

6. Optical fiber connector which is characterized by a protective sleeve as a component of the connector body for holding the portion of an optical fiber substantially covered by covering layer, and by a cylindrical and ceramic ferrule having a center-axial bore of inner diameter allowing for concentrical insertion of an optical fiber depending upon outer diameter of said optical fiber stripped of its covering layer and having an outer surface coaxial with said center-axial bore, said ferrule being fixed at one end of said protective sleeve so as to project from said connector body by a predetermined length, and said optical fiber being bonded at least to said ferrule by means of an adhesive having a lower refractive index than that of said optical fiber.

* * * * *